United States Patent [19]

Templin

[11] Patent Number: 4,807,742

[45] Date of Patent: Feb. 28, 1989

[54] DRAG LINK CHAIN

[75] Inventor: Harry W. Templin, Morganton, N.C.

[73] Assignee: PT Components, Inc., Indianapolis, Ind.

[21] Appl. No.: 40,493

[22] Filed: Apr. 20, 1987

Related U.S. Application Data

[63] Continuation of Ser. No. 733321, May 13, 1985, abandoned.

[51] Int. Cl.$^4$ ............................................. B65G 19/24
[52] U.S. Cl. .................................... 198/730; 474/234
[58] Field of Search ............... 198/728, 730, 734, 834; 474/234; 59/5, 7, 84, 90

[56] References Cited

U.S. PATENT DOCUMENTS

| | | | |
|---|---|---|---|
| 2,159,396 | 5/1939 | Miller | 198/730 |
| 3,054,301 | 9/1962 | Kimmerer et al. | 474/234 |
| 3,665,704 | 5/1972 | Trudeau | 474/234 |
| 4,276,040 | 6/1981 | Petershack | 474/234 |

Primary Examiner—Joseph E. Valenza
Attorney, Agent, or Firm—Robert A. Brown

[57] ABSTRACT

An improved drag link chain is fabricated from a plurality of links joined together in articulated relationship for moving bulk material along a trough or other conveying surface. The links are made having an open end and a closed end. The closed end includes a barrel having a flat side for pushing material. The barrel is disposed within the closed end with its flat side facing inwardly from the closed end toward the open end of the link. The barrel has a rounded back side that seats on a tooth of a sprocket so that a joint of articulation is caused between an inner diameter of a bore of the barrel and an outer diameter of a pin that joins together open and closed ends of tandemly connected links to form an endless drag chain. The barrels of the links, when engaged by teeth of a sprocket are seated thereon with no relative rotation therebetween and thereby avoid excessive wear on the barrels and the teeth of the sprocket.

10 Claims, 2 Drawing Sheets

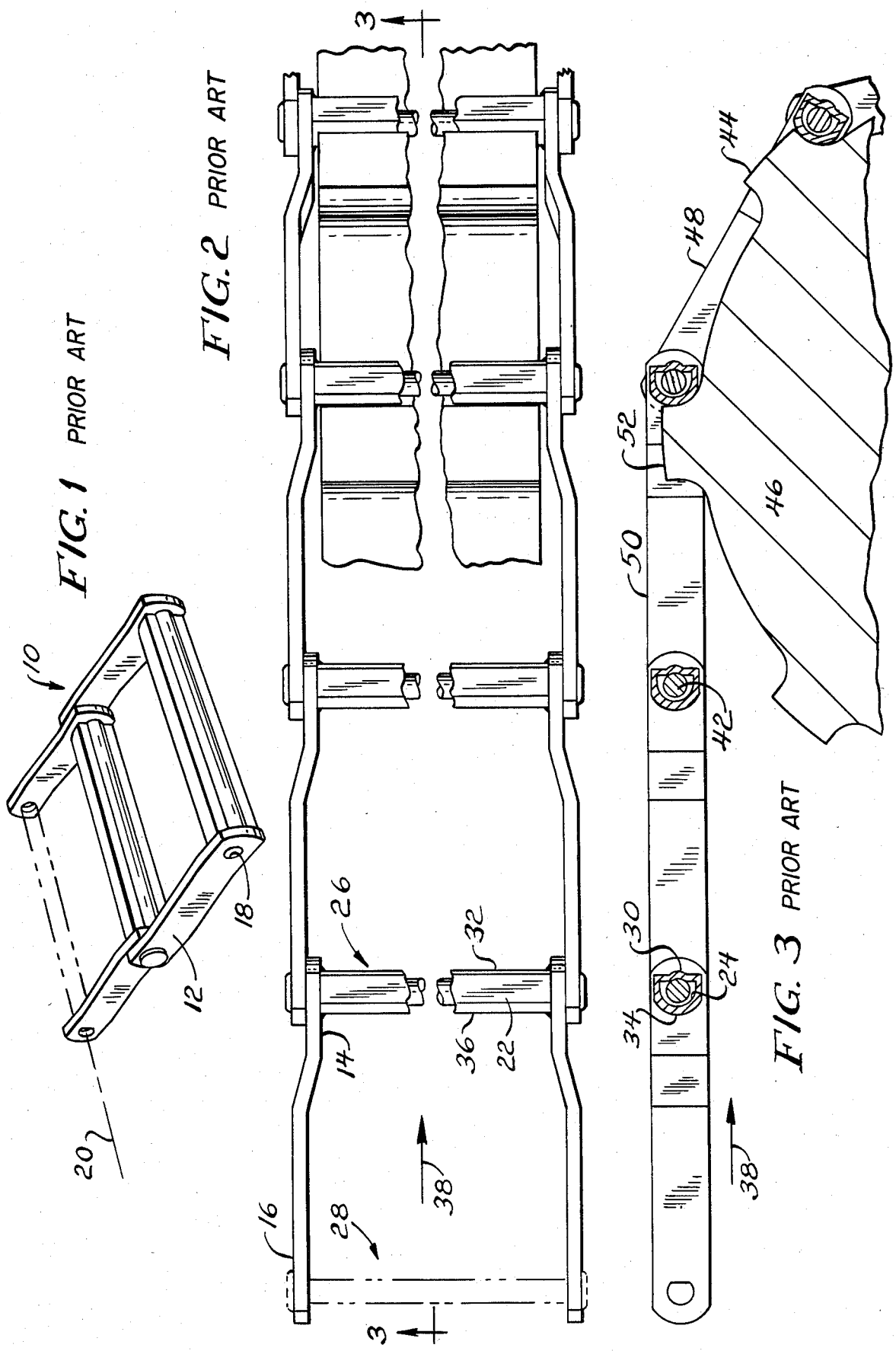

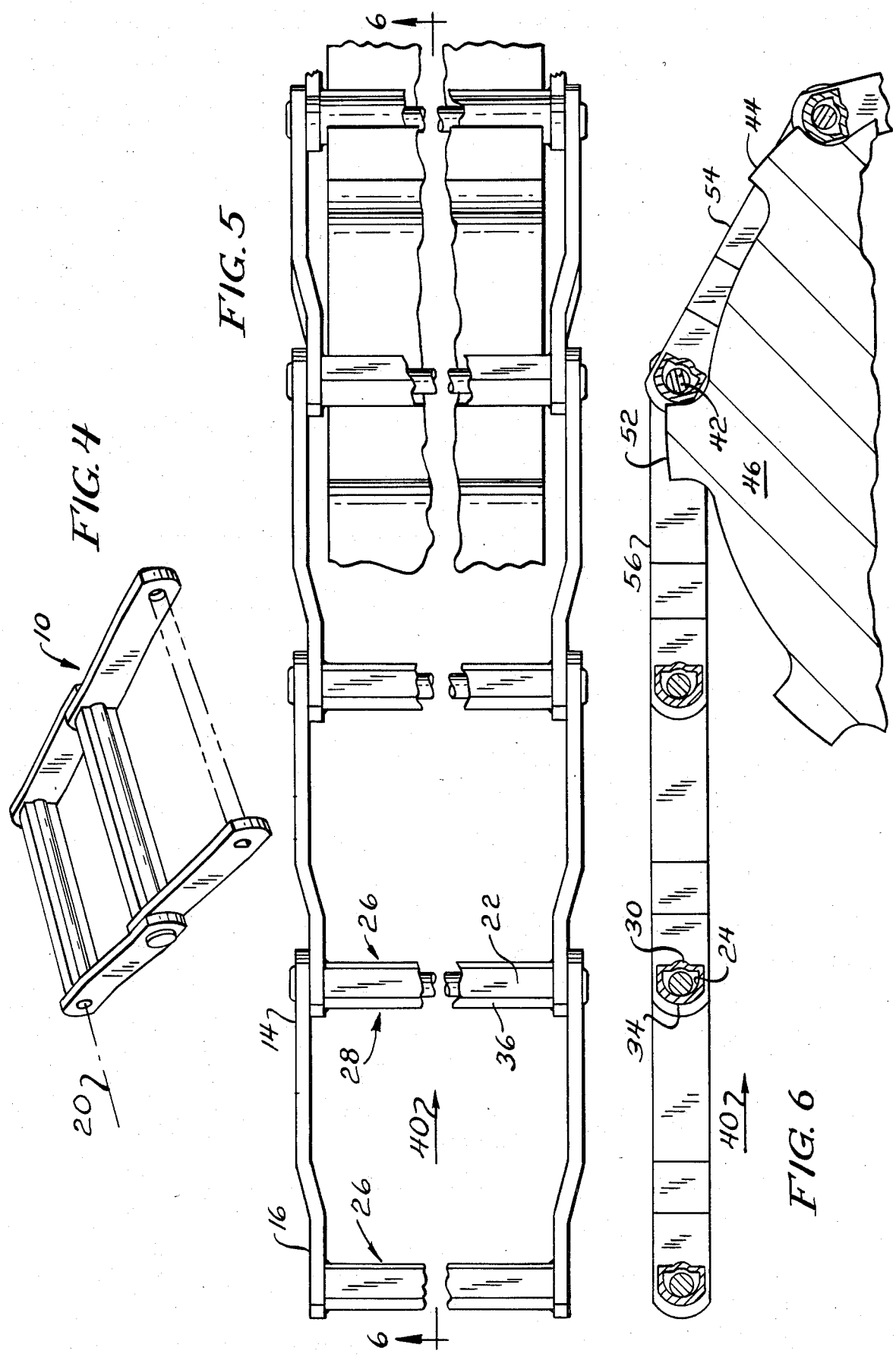

DRAG LINK CHAIN

This is a continuation of application Ser. No. 06/733321, filed May 13, 1985 now abandoned.

BACKGROUND OF THE INVENTION

The present invention relates generally to flight conveyors and more particularly to improved drag link chains for moving bulk material along a trough or other conveying surface. The chains are constructed from links having a closed end and an open end.

Links are made by welding, casting or otherwise fixedly securing one piece barrels to first ends of sidebars forming the closed end of a link. A number of links as desired or required are joined together in tandem fashion to form a chain by inserting a pin through a barrel of a closed end of a first link and press fitting the outer ends of the pin in a second end of each sidebar forming the open end portion of the link. The leading side of each link barrel has a flat, vertical surface to act as a pusher of the material being conveyed.

Drag or offset link chains are operated normally with the "open end" of the link facing forward. When a chain is run in this manner, wear is concentrated on both the outer diameter of the pin and the inner diameter of the barrel. If the direction of travel is reversed, and the "closed end" of the links is facing forwardly, there is caused a considerable, undesired amount of concentrated wear resulting from joint articulation between the outer barrel surface of the link and a sprocket tooth.

In the past, a number of attempts have been made to solve the problems encountered and solved by the present invention. In U.S. Pat. No. 581,689 to J. A. Brown, there is shown a chain construction using links wherein apertures are formed that include V-shaped projections for bearing against transverse pins having centrally enlarged portions concave on one side and convex on the other side. Friction between pin and link is presumably minimized by round surface contact of the pin with knife end contact of the projection in the aperture of a link.

U.S. Pat. No. 1,951,764 to F. L. Morse shows a drive chain having links joined together by pins having an arcuate surface on one side and a flat keying surface on the other side. The links rotate about the round side of the pintle but are restrained from turning by the flat side.

U.S. Pat. No. 2,956,442 to C. B. Krekeler shows a mining chain having block links joined together by pintles having a flat side and an arcuate side and further having a cut away, eccentric inner arcuate surface and round outer end portions for fitting in apertures or perforations of the links.

U.S. Pat. No. 3,585,872 to G. S. McDowell is similar to Krekeler U.S. Pat. No. 3,956,442 and shows a cutter chain having cutter bit links and connector links joined together by pintles shaped to provide outer shoulder portions with one side arcuate and the other side flat, an intermediate, cut away portion with an arcuate surface between the flat sided portions of the shoulders.

U.S. Pat. No. 3,880,014 to W. H. Bendall shows a drive chain made from link members serially connected in overlapping relationship so that their connected portions form arcuate rocking bearing surfaces therebetween.

U.S. Pat. No. 4,036,072 to J. F. McKeon shows a steel roller chain wherein bushings, with rollers free to rotate thereabout, are welded between side bars to form a compact structure with no outward projections beyond the outside faces of the side bars, thus reducing overall chain width.

SUMMARY OF THE INVENTION

Accordingly, it is a primary object of the present invention to provide an improved construction of chain links by seating the links on teeth of a sprocket so as to avoid relative movement therebetween and thereby minimize wear that usually occurs when teeth of a sprocket drive against the barrel of a drag chain link. This object is achieved by welding, casting or otherwise fixedly securing a one piece barrel between first ends of a pair of sidebars to form a closed end portion of a link, wherein the barrel has a flat vertical surface facing inwardly of the link toward second ends of the sidebars, the second ends of the sidebars forming an open end portion of the link. A plurality of links are joined together by inserting a pin through a barrel of a closed end portion of a link and press fitting the outer ends of the pin into ends of sidebars forming an open end portion of a second link that has been positioned to overlap the sidebars of the first link and have apertures aligned coincidentally with the bore of the barrel of the first link.

A further advantage of the improved chain link construction is to provide a closed end portion of a link having disposed thereat a flat sided barrel facing toward an open end portion of the link and a rounded portion of the barrel seats on the root diameter of a sprocket tooth restrained from rotation therebetween, thereby reducing wear on both the outer circumferential surface of the barrel and teeth of the sprocket.

A further object of the present invention is to provide an improved drag link construction wherein closed end portions of links forming an endless conveyor chain at times contact teeth of sprockets without relative rotation therebetween.

An additional advantage of the present invention is to provide an improved drag link construction wherein a barrel is secured at a closed end portion thereof and the barrel has a flat side portion oriented towards an open end of the link, a plurality of links being joined together by pins to form an endless conveyor chain wherein at times the barrels seat on teeth of sprockets with no relative rotation therebetween.

An improved drag link in accordance with the present invention comprises a plurality of sidebars having portions thereof angled obliquely inwardly to form first end portions thereof, a barrel having formed therethrough a bore being disposed substantially normal to and between the first end portions of the sidebars and fixedly secured thereat to form a closed end portion of a first link, the barrel having a flat vertical surface formed thereon facing toward second end portions of the sidebars forming an open end portion of the first link, the flat vertical surface of the barrel forming a plane normal to a longitudinal axis of the link, the barrel of the link having a rounded exterior surface formed to cooperate with and seat on a tooth of a sprocket for driven engagement therewith, a pin for at times being inserted through the bore of a barrel of a second link placed in juxtaposition between the second end portions of the sidebars of the first link to fixedly secure the barrel of the second link to the second end portion of the first link sidebars, the barrel of each link being adaptable at times to seat on teeth of the sprocket during driven engagement therewith so that no relative rotation occurs therebetween.

DESCRIPTION OF THE DRAWINGS

The foregoing and other characteristics, objects, features and advantages of the present invention will become more apparent upon consideration of the following detailed description, having reference to the accompanying figures of the drawings, wherein:

FIG. 1 depicts a pair of chain links typical of offset drag chains which reflect the state of the present art.

FIG. 2 is a top view of an assembly of links showing the relationship of the component parts to each other and to the driving sprocket.

FIG. 3 is a sectional view taken along line 1—1 of FIG. 2 showing the point of articulation with the sprocket and the links immediately preceding and following that point.

FIG. 4 depicts a pair of chain links fabricated and assembled in accordance with the present invention.

FIG. 5 is a top view of an assembly of links similar to FIG. 2.

FIG. 6 is a sectional view taken along line 2—2 of FIG. 5 particularly pointing out the point of articulation between the pin and the barrel bore so as to the manner in which the present invention distinguishes over the structure of FIGS. 1-3.

DESCRIPTION OF THE PREFERRED EMBODIMENT

Referring now to the figures of the drawing, there is illustrated a drag chain link generally identified by the reference numeral 10. The link 10 comprises a pair of sidebars 12 formed generally in the shape of a solid rectangle or parallelopiped, each sidebar having a portion nearer one of its ends being bent inwardly or obliquely for a predetermined length and then being bent forwardly to assume a straight position parallel to its other end. The two sidebars 12 are placed parallel to and apart from each other having their first ends 14 spaced apart a distance less than that separating the sidebars at their second ends 6. Each sidebar 12 has apertues 18 formed at its outer ends. The apertures 18 are disposed oppositely from each other along a longitudinal coincident axis 20 when the sidebars are aligned in parallel relationship.

A bushing or barrel 22 is disposed between the sidebars 12 generally perpendicular or normal thereto at the first ends 14 of the sidebars and is securely affixed thereat as by welding, casting or the like. The barrel 22 has a bore 24 formed therethrough. The bore 24 of the barrel 22 has a longitudinal axis that is coincidental with the longitudinal axis 20 of the apertures 18 when the barrel is securedly disposed between the sidebars 12.

The barrel 22 when secured to the first ends of the sidebars 12 cooperates therewith to form a narrow closed end of the link 10, the closed end of the link being identified generally by reference numeral 26. The second ends 16 of the sidebars 12 cooperate to form a wider portion of the link that comprises an open end thereof, the open end of the link identified generally by reference numeral 28.

The barrel is formed to have a flat generally vertical surface 30 on a first or a front side 32 and a round surface 34 on a second or back side 36. In FIGS. 1-3, it will be noted the barrel is secured between the sidebars having its first or front flat vertical surface 30 facing outwardly from the closed end and away from the open end of the link, forwardly in the direction of travel of the chain as represented by an arrow 38 in FIGS. 2-3. In FIGS. 4-6, it will be noted the barrel 22 is secured between the sidebars 12 having its first or front flat vertical surface 30 facing inwardly toward the open end 28 of the link 10, but still facing forwardly in the direction of travel of the chain as represented by an arrow 40 in FIGS. 5-6. The purpose of this significant difference in orientation will be hereinafter explained in greater detail.

A pin 42 is effective to connect together a plurality of links so as to form an articulated joint therebetween. A plurality of the pins 42 are utilized to join a series of links in tandem relationship to form an endless chain. The open end 28 of a first link is positioned over and about a closed end 26 of a second link so that the apertures of the sidebars of the first link are aligned with the bore of the barrel secured between the sidebars of the second link. The pin 42 is fitted through the bore of the barrel and has its outer ends press fitted or otherwise secured into the apertures 18 of the sidebars 12 comprising the open end portion 28 of the first link. The pin in its press fitted or otherwise secured position is locked against rotation. Additional links are joined in succession in similar fashion to form an endless chain of a predetermined or desired length.

In prior art construction, as represented in FIGS. 1-3, the chain has its links oriented with their closed ends forward along with the flat side of each barrel facing forwardly so as to push material along a trough or other conveying surface. As the sprocket rotates clockwise, a tooth 44 of a sprocket 46 engages with and drives against a barrel, disposed at a closed end 26 of a first link 48. Continued clockwise rotation of the sprocket causes the link to fully seat on the sprocket so that the rounded portion 34 of the barrel 22 of the link 48 is seated against tooth 44 of the sprocket and the open end 28 of link 48 forms a joint of articulation with the closed end 26 of a following link 50. As the sprocket continues to rotate clockwise, the link 50 having its barrel 22 in seated engagement with a tooth 52 of the sprocket 46 forms a joint of articulation or slidable friction therewith and results in maximum wear on both the barrel and the tooth of the sprocket. As a barrel of each following or successive link moves into engagement with a sprocket tooth, there is formed an articulated joint between a barrel and a sprocket tooth resulting in great stress and excessive wear therebetween. As a consequence, there is caused premature wear of both the barrel of a link and the tooth of a sprocket that ultimately causes failure of one or both of these conveyor components.

Referring now to the link 10 shown in FIG. 4 of the present invention, it will be readily observed that a significant structural difference is depicted in that the flat front vertical surface 30 of the barrel 22 faces in a forward direction toward the open end 28 of the link 10.

Drag type chains as hereinbefore discussed are constructed having the flat front surface of the barrel facing in the direction of travel of the chain so that the chain can push material efficiently along a trough or other conveying surface.

With reference specifically to FIGS. 5-6, it will be noted that the chain has its links disposed so that their open ends 28 are oriented forwardly in the direction of travel (arrow 40) and the flat side 30 of each barrel 22 faces forwardly for pushing material along a conveying surface. As the sprocket 46 rotates clockwise, the tooth 44 of the sprocket 46 engages with and drives against the rounded side 34 of a barrel 22 disposed at a closed end 26 of a preceding link of the chain. As the sprocket continues to rotate, the barrel 22 of a link 54 becomes fully seated against the tooth 52 of the sprocket 46.

Further clockwise rotation of the sprocket causes a pin 42 of a following link 56 fitted within the bore 24 of the barrel 22 of the link 54 to form a joint of articulation between the outer diameter of the pin and the inner diameter of the bore 24 of the barrel 22. In this mode, the barrel is stationary relative to the sprocket 46 while the pin 42 disposed at the open end of link 56 rotates within and against the bore 24 of the barrel 22 of link 54. It will be noted that the articulated joint formed between the barrel bore and pin outer diameter occurs by contact between the rearward curved portion of the barrel bore and a portion of the circumferential surface of the pin. Rotation between the inner diameter of the bore and the outer diameter of the pin permits the rounded outer portion of the barrel to be fully seated on the root diameter at the base of the sprocket tooth and thereby avoids forming an articulated point between the barrel and a sprocket tooth. The barrel maintains a fully seated non-rotative relationship with the sprocket tooth throughout rotation of the sprocket and until the barrel is disengaged from the sprocket tooth.

Thus, there is no relative motion or slidable friction between a barrel and a sprocket tooth. As a result, no stresses of magnitude are created, nor is excessive wear caused on a barrel of a link or a sprocket tooth that ultimately could contribute to the failure of one or both of these conveyor components.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. Improved chain link construction comprising a first sidebar and a second sidebar, each said sidebar formed generally in the shape of a parallelopiped and having a first end portion angled obliquely inwardly for a predetermined distance and thereafter bent forwardly to assume a straight length of the first end portion, said sidebars spaced parallel to and apart from each other so that said first ends are separated by a distance less than the distance separating said sidebars at second ends thereof, a barrel fixedly secured between said sidebars substantially normal thereto at said first ends, said barrel and said first ends forming a closed end of the link, said second ends of the sidebars forming an open end of the link, said barrel having an outer first side formed to have a substantially flat, generally vertical surface facing inwardly from the closed end of the link toward said open end of the link, said barrel having an outer second side formed to have a round surface facing outwardly and away from the closed end of the link, a bore formed through said barrel shaped so as to provide substantially uniform wall thickness throughout the length of the barrel, said barrel bore having an inner first surface formed to provide a substantially flat generally vertical side of complementary shape to the outer first side of said barrel, said barrel bore having an inner second surface formed to provide a concavely curved rearward surface of complementary shape to the outer second side of said barrel, a cylindrically shaped pin adaptable to be fitted within said bore of the barrel and connect second ends of an open end of a second link disposed over and about the closed end of the link, said pin being secured in the second ends of the link and locked against both sliding and rotative movement therein, said pin having a diameter less than the longitudinal distance between said inner first surface of the bore and a most rearwardly disposed portion of the concavely rearward surface thereof so as to provide variable clearance between said pin and said bore, said barrel bore having its concavely curved rearward surface in continuous contact throughout its length with an outer rearwardly disposed portion of the circumferential surface of the pin, said barrel and said pin being effective to form an articulated joint only between said concavely curved portion of said bore and said rearwardly disposed portion of the circumferential surface of the pin.

2. An improved chain link construction adaptable for use in a toothed sprocket conveyor system including a plurality of articulated links forming an endless chain, wherein each said links comprises first and second sidebars having first end portions angled obliquely for a preselected length and thereafter angled reversely to terminate in straight first ends, said sidebars spaced parallel to and apart from each other so that said first ends are closer to each other than second ends of said sidebars, a barrel fixedly secured between said first ends of the sidebars in substantially perpendicular relationship thereto, forming thereat a closed end of the link, said second ends of the sidebars forming thereat an open end of the link, said barrel having a first outer side formed with a substantially flat, vertical surface facing inwardly from the closed end of the link toward the open end of the link and forwardly in the direction of travel of the conveyor system, said barrel having a second outer side formed with a round circumferential surface facing outwardly from the closed end of the link and rearwardly from the direction of travel of the conveyor system adaptable to cooperate with a tooth of a sprocket, a bore formed through said barrel shaped so as to provide substantially uniform wall thickness throughout the length of the barrel, said barrel bore having an inner first surface formed to provide a substantially flat generally vertical side of complementary shape to the outer first side of said barrel, said barrel bore having an inner second surface formed to provide a concavely curved rearward surface of complementary shape to the outer second side of said barrel, a cylindrically shaped pin for inserting through the bore of the barrel and adaptable to have its outer end secured both for rotation and sliding movement at second ends of an open end of a following link placed in juxtaposition with the closed end of a preceding link, said pin having a diameter less than the longitudinal distance between said inner first surface of the bore and a most rearwardly disposed portion of the concavely rearward surface thereof so as to provide variable clearance between said pin and said bore, said barrels bore having its concavely curved rearward surface in continuous contact throughout its length with an outer rearwardly disposed portion of the circumferential surface of the pin, said barrel and said pin being effective to form an articulated joint only between said concavely curved portion of said bore and said rearwardly disposed portion of the circumferential surface of the pin, whereby said round outer circumferential surface of said barrel when seated against a tooth of the sprocket is restrained from relative rotation with the sprocket tooth to avoid slidable friction therebetween and excessive wear on both the barrel and the sprocket tooth.

3. The improved chain link construction of claim 1 wherein the barrel is welded to the closed end of the link.

4. The improved chain link construction of claim 2 wherein the barrel is welded to the closed end of the link.

5. The improved chain link construction of claim 2 wherein the articulated joint between the barrel and the pin prevents relative motion between the round surface of the barrel and the sprocket tooth during rotation of the sprocket until the barrel is disengaged from the sprocket tooth.

6. The improved chain link construction of claim 2 wherein said substantially flat, vertical surface is effective to move bulk material along a conveying surface.

7. The improved chain link construction of claim 1 wherein a longitudinal axis of the bore of the barrel is coincident with a longitudinal axis of the pin.

8. The improved chain link construction of claim 2 wherein the open end of each link of the conveyor system faces only in the direction of travel thereof.

9. The improved chain link construction of claim 1 wherein said outer diameter of the pin contacts the inner diameter of the bore at a rearward curved portion thereof.

10. The improved chain link construction of claim 2 wherein said outer diameter of the pin contacts the inner diameter of the bore at a rearward curved portion thereof.

* * * * *